US012401506B2

(12) United States Patent
Rodriguez Bravo

(10) Patent No.: US 12,401,506 B2
(45) Date of Patent: Aug. 26, 2025

(54) REMOVING INTERACTIONS FROM A VIRTUAL ENVIRONMENT

(71) Applicant: Kyndryl, Inc., New York, NY (US)

(72) Inventor: Cesar Augusto Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 188 days.

(21) Appl. No.: 18/357,194

(22) Filed: Jul. 24, 2023

(65) Prior Publication Data

US 2025/0038972 A1 Jan. 30, 2025

(51) Int. Cl.
*H04L 9/00* (2022.01)
*G06F 21/36* (2013.01)
*H04L 9/08* (2006.01)
*H04L 9/14* (2006.01)
*H04L 9/32* (2006.01)

(52) U.S. Cl.
CPC .............. *H04L 9/0891* (2013.01); *H04L 9/14* (2013.01); *H04L 9/3247* (2013.01)

(58) Field of Classification Search
CPC ........ H04L 9/0891; H04L 9/14; H04L 9/3247
See application file for complete search history.

(56) References Cited

U.S. PATENT DOCUMENTS

| | | | |
|---|---|---|---|
| 10,817,066 B2 | 10/2020 | Ross et al. | |
| 11,176,226 B2 | 11/2021 | Bernardi | |
| 2018/0069844 A1* | 3/2018 | Cignetti | G06F 9/45533 |
| 2020/0019295 A1 | 1/2020 | Spivack et al. | |

(Continued)

FOREIGN PATENT DOCUMENTS

| | | | |
|---|---|---|---|
| KR | 102358186 B1 | 2/2022 | |
| WO | WO-2020118262 A1 * | 6/2020 | ............... H04L 9/50 |

(Continued)

OTHER PUBLICATIONS

Bushra AlBelooshi, Ernesto Damiani, Khaled Salah, Thomas Martin; "Securing Cryptographic Keys in the Cloud: A Survey"; IEEE Cloud Computing; Year: Jul./Aug. 2016; Magazine Article; vol. 3, Issue 4; Publisher: IEEE; pp. 42-56 (Year: 2016).*

(Continued)

*Primary Examiner* — Amir Mehrmanesh
*Assistant Examiner* — Courtney D Fields
(74) *Attorney, Agent, or Firm* — CANTOR COLBURN LLP; Erik Swanson

(57) ABSTRACT

Embodiments relate to removing interactions from a virtual environment thereby executing the right to be forgotten in the virtual environment. In response to receiving a request to remove interactions from a virtual environment, a search is performed in the virtual environment for cryptographic keys embedded with a user identification corresponding to the request. The cryptographic keys embedded with the user identification are deleted in the virtual environment, where the interactions have been signed with the cryptographic keys embedded with the user identification in the virtual environment. In response to deleting the cryptographic keys embedded with the user identification in the virtual environment, there is a modification to a presentation of the interactions in the virtual environment.

19 Claims, 15 Drawing Sheets

(56) References Cited

U.S. PATENT DOCUMENTS

2020/0404019 A1* 12/2020 Drake .................. H04L 9/3226
2022/0327525 A1   10/2022 Tsitrin et al.

FOREIGN PATENT DOCUMENTS

WO        2021016219 A1      1/2021
WO     WO-2022272155 A1 * 12/2022  ............. G06F 21/30

OTHER PUBLICATIONS

Huff, "Meta testing end-to-end encryption for Quest VR messenger," URL: https://mpost.io/meta-testing-end-to-end-encryption-for-quest-vr-messenger/; Jun. 13, 2022; 3 pages.
Ryu et al., "Design of Secure Mutual Authentication Scheme for Metaverse Environments Using Blockchain," IEEE Access, vol. 10, 2022, pp. 98944-98958.
Salim, "Dubai Metaverse Assembly announced for September; to showcase 'real' meetings in virtual world," Khaleej Times, Jul. 19, 2022, 3 pages.
Shepherd, "20 Essential Meta Statistics You Need to Know in 2023," Social Shepherd, Jan. 3, 2023, 11 pages.
Skiff Team, "How can you message a crypto wallet?" URL: https://skiff.com/blog/crypto-wallet-messaging; Sep. 26, 2022; 4 pages.

* cited by examiner

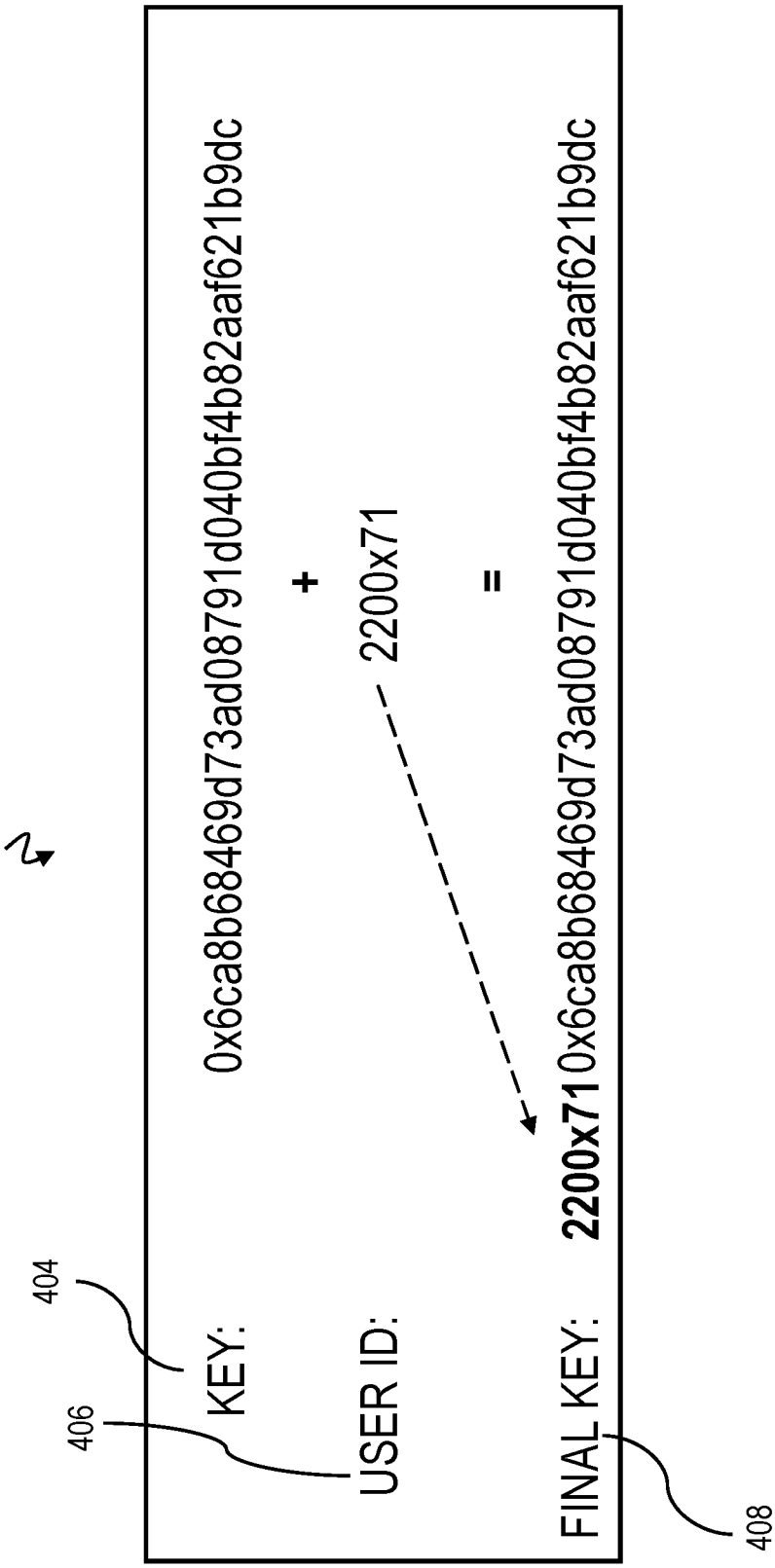

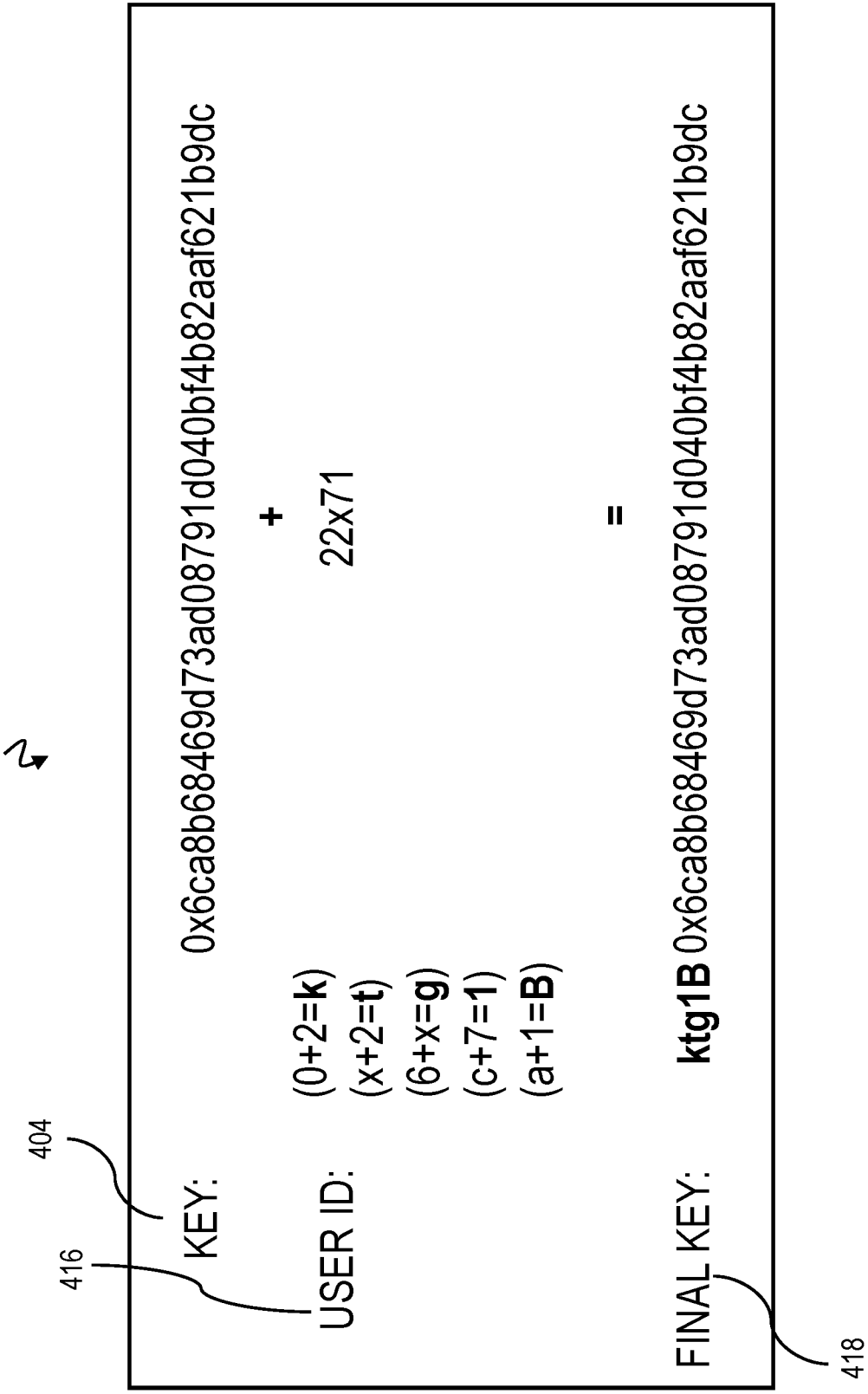

FIG. 7

Search for keys embedded user ID: 2200x71 x2108vg0x6ca8b68469d73ad08791d040bf4b82aaf621b9dc
2200x710x6ca8b68469d73ad08791d040bf4b82aaf621b9dc
rtBBTT10x6ca8b68469d73ad08791d040bf4b82aaf621b9dc
ad087910x6ca8b68469d73ad08791d040bf4b82aaf621b9dc
2200x710x6ca8b68469d73ad08791d040bf4b82aaf621b9dc
ad087910x6ca8b68469d73ad08791d040bf4b82aaf621b9dc

IDENTIFIED KEYS

REMOVING INTERACTIONS FROM A VIRTUAL ENVIRONMENT

BACKGROUND

The present invention generally relates to computer systems, and more specifically, to computer-implemented methods, computer systems, and computer program products configured and arranged for removing interactions from a virtual environment thereby executing the right to be forgotten in the virtual environment.

Virtual reality is a simulated experience that can employ tracking and three-dimensional (3D) near-eye displays to offer the user an immersive feel of a virtual world. Applications of virtual reality may include entertainment particularly video games, education, business, socializing, etc. Other distinct types of virtual reality technology include augmented reality and mixed reality, sometimes referred to as extended reality. Virtual reality systems can use virtual reality headsets to generate realistic images, sounds, and other sensations that simulate a user's physical presence in the virtual reality. Virtual reality equipment enables a user to look around the artificial world, move around in it, and interact with virtual features or items. The simulated experience is commonly created by virtual reality headsets including, for example, a head-mounted display with a small screen in front of the eyes.

Over time, many communications can occur in virtual reality. It would be beneficial to provide features to efficiently remove past interactions in the virtual reality.

SUMMARY

Embodiments of the present invention are directed to computer-implemented methods for removing interactions from a virtual environment thereby executing the right to be forgotten in the virtual environment. A non-limiting computer-implemented method includes, in response to receiving a request to remove interactions from a virtual environment, searching the virtual environment for cryptographic keys embedded with a user identification corresponding to the request. The method includes deleting the cryptographic keys embedded with the user identification in the virtual environment, wherein the interactions have been signed with the cryptographic keys embedded with the user identification in the virtual environment. Also, the method includes in response to deleting the cryptographic keys embedded with the user identification in the virtual environment, causing a modification to a presentation of the interactions in the virtual environment.

This can provide an improvement over known methods for virtual environments by providing a technique for a user to efficiently remove his/her interactions from the virtual environment. This increases user privacy in the virtual environment that is hosted by one or more computer systems. This also provides a software tool for the user to utilize, in which the software tool enables the right to be forgotten in the virtual environment.

In addition to one or more of the features described above or below, additional features include causing the cryptographic keys embedded with the user identification to be deleted from user terminals coupled to the virtual environment. This advantageously ensures that interactions by the user, such as messages, are not viewable by other users once the cryptographic keys are deleted.

In addition to one or more of the features described above or below, additional features include the user identification anonymously corresponds to a user in the virtual environment. This advantageously maintains privacy for the user and maintains anonymity between the user and the user identification.

In addition to one or more of the features described above or below, additional features include the user identification is not displayed in the virtual environment. This advantageously maintains privacy for the user and maintains anonymity between the user and the user identification.

In addition to one or more of the features described above or below, additional features include the user identification is different from a username that is displayed in the virtual environment. This advantageously maintains privacy for the user and maintains anonymity between the user and the user identification. This ensures that the user identification is not displayed in the virtual environment. This ensures that user identification is not the same as anything displayed in the virtual environment.

In addition to one or more of the features described above or below, additional features include where causing the modification to the presentation of the interactions in the virtual environment includes deleting messages sent with the cryptographic keys embedded with the user identification from the virtual environment. This advantageously provides a technique for a user to remove his/her past messages from the virtual environment. This increases user privacy in the virtual environment that is hosted by one or more computer systems.

In addition to one or more of the features described above or below, additional features include where causing the modification to the presentation of the interactions in the virtual environment includes obfuscating messages sent with the cryptographic keys embedded with the user identification in the virtual environment. This advantageously provides a technique for a user to obscure the content of his/her past messages in the virtual environment. This increases user privacy in the virtual environment that is hosted by one or more computer systems.

In addition to one or more of the features described above or below, additional features include providing a new user identification for upcoming messages, and embedding the new user identification with other cryptographic keys that are utilized to sign the upcoming messages. This advantageously enables the user to send new messages in the virtual environment, after removing the old messages.

In accordance with one or more embodiments, a non-limiting computer-implemented method include receiving a user identification for a virtual environment, the user identification not being displayed in the virtual environment. The method includes, in response to receiving the user identification, searching the virtual environment for cryptographic keys having the user identification, and deleting the cryptographic keys having the user identification in the virtual environment, where messages are signed with the cryptographic keys. The method includes, in response to deleting the cryptographic keys having the user identification in the virtual environment, deleting the messages signed with the cryptographic keys having the user identification in the virtual environment.

This can provide an improvement over known methods for virtual environments by providing a technique for a user to remove his/her messages from the virtual environment. This increases user privacy in the virtual environment that is hosted by one or more computer systems. This also provides a software tool for the user to utilize, in which the software tool enables the right to be forgotten in the virtual environment.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A depicts an example of embedding a user identification/identifier of a sender user with a public key of a recipient according to one or more embodiments of the present invention;

FIG. 4B depicts an example of embedding a user identification/identifier of a sender user with a public key of a recipient according to one or more embodiments of the present invention;

FIG. 7 depicts an example of searching cryptographic public keys for a selected user identification in order to delete the identified cryptographic public keys according to one or more embodiments of the present invention;

DETAILED DESCRIPTION

Figure 1:
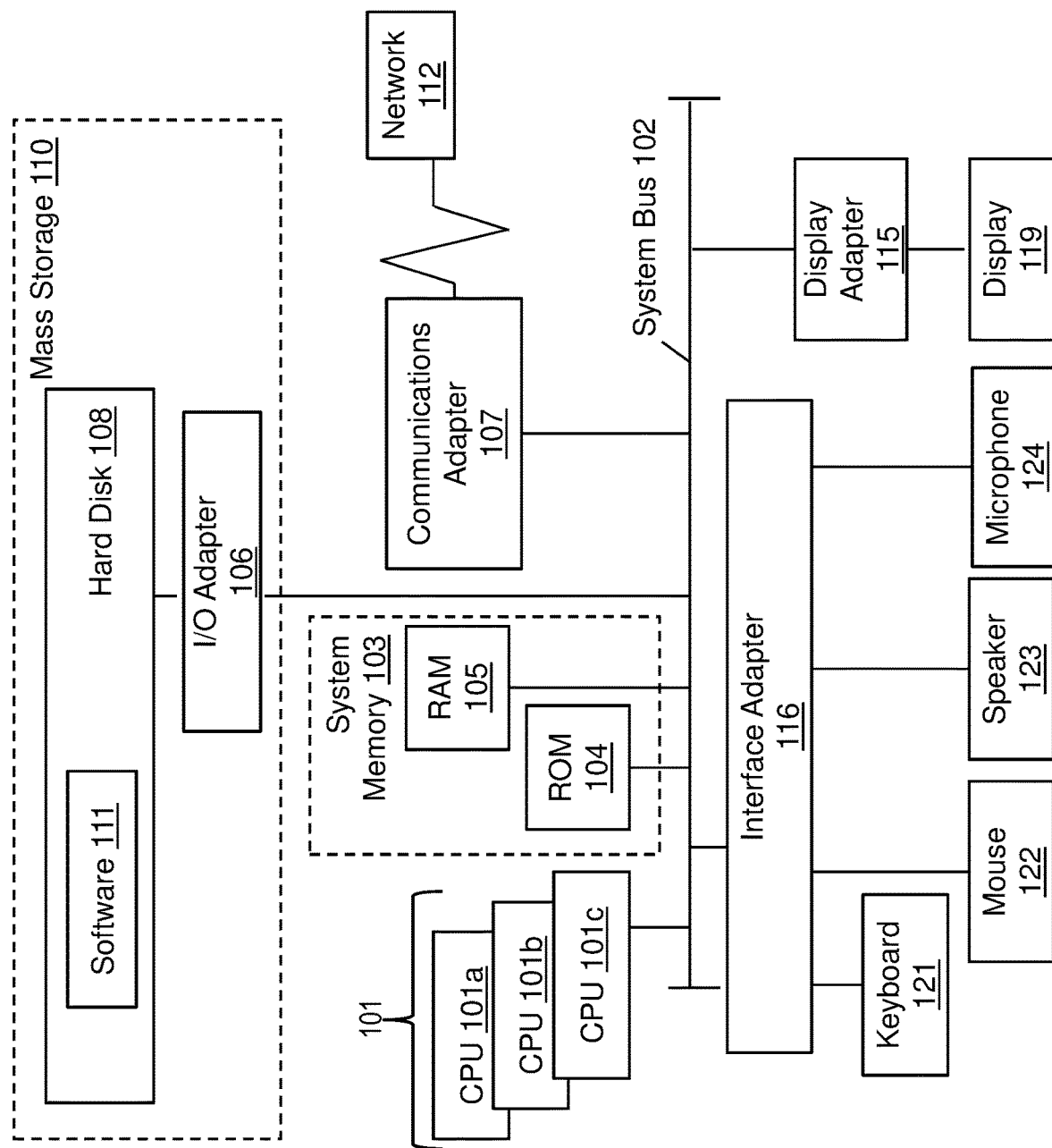
FIG. 1 depicts a block diagram of an example computer system for use in conjunction with one or more embodiments of the present invention.

One or more embodiments are configured and arranged for removing interactions from a virtual environment thereby executing the right to be forgotten in the virtual environment. According to one or more embodiments, a novel method is provided that enables the user to control not only future messages but to also control access to past messages sent by the user in the virtual environment.

The virtual environment includes interactive communication environments. Interactive communication environments can include any communication system in which users can communicate and interact in real time with each other. Interactive communication environments can include various types of computing environments, which may be computer generated graphical environments that require computer systems/equipment to access and interact. For example, one could not access and operate in an interactive communication environment with a simple pen/pencil and sheet of paper, as understood by one of ordinary skill in the art. Further, one could not access and operate in an interactive communication environment having other users by only using the human mind, as understood by one of ordinary skill in the art. Interactive communication environments can include virtual reality, gaming environments of a gaming systems, chat environments, etc. Interactive communication environments allow a communication, such as an audio communication (i.e., voice), visual communication (e.g., movement, gestures, and/or actions of an avatar), and/or text communication, from a first user to be automatically output in real time, for example, on a display and/or on speakers to second user without requiring the second user to take an action to receive the output.

Virtual reality is the latest milestone in the digital evolution of social media and web interactions. A well-known virtual environment for virtual reality has 28.7 billion active users. An example virtual reality platform is the Metaverse® virtual reality platform. Now, as can be imagined, a virtual environment with such a large number of users can have a lot of risks. Virtual reality platforms, such as the Metaverse®, normally have an open text chat. The chat rooms are open and anyone in the virtual environment can access it, for example, to send private messages or send public messages to the public (everyone). However, there is a privacy risk associated with those messages in chat rooms because a user may not wish to have the messages of today and/or the past that were created in one context show up tomorrow in a different context. For example, a user may have an intense discussion or argument with a person in the group chat of the virtual environment. There could be a case where another person may be harassing the user in the group chat of the virtual environment. Also, there could be a case in which a bot (or automated software) may have been attempting to scam the user. In any of these situations, the user is likely to feel emotionally impacted and may react with messages that are not preferred. As time passes, the user may wish that those types of messages were removed from the virtual environment, because the messages could affect the user's reputation, the user may hold a different opinion, the user may have been a minor/youth, etc. However, in the virtual environment, deleting those messages could be a very complicated task. This is because in some virtual environments, global chats are separated by virtual worlds, rooms, environments, etc. Therefore, in order to delete all of the user's previous messages, the user needs to manually trace his/her electronic footsteps by reentering all the virtual worlds, rooms, environments, etc., that were previously visited to manually delete his/her messages, which could be almost impossible as some virtual environments could have hundreds or thousands of virtual worlds, rooms, environments, etc.

Technical solutions and benefits provide software tools to remove interactions from a virtual environment thereby executing the right to be forgotten in the virtual environment hosted on one or more computer systems. One or more embodiments provide a system and method to enable the user with the ability to delete all of his/her prior interactions in the virtual environment. Interactions the virtual world include, for example, messages, video, audio, etc. For explanation purposes, messages may utilize for understanding, but one or more embodiments are not limited to messages. Additionally, the messages may include video, audio, text, etc. One or more embodiments provide the users with a software tool or interface to execute their right to be forgotten in the virtual environment by causing cybersecurity measures related to cryptographic keys to be implemented. Moreover, one or more embodiments provide a technical solution for a user to delete all of his/her interactions including messages in all the virtual worlds, rooms, environments, etc., in a virtual environment (such as a Metaverse®) in accordance with cryptographic keys utilized in the virtual environment. Further, one or more embodiments provide the user with the option to delete all of his/her messages from all virtual environments from a single user interface, without having to enter multiple virtual worlds, rooms, environments, etc. Additionally, the system can enable the deletion of those messages across different virtual environments.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
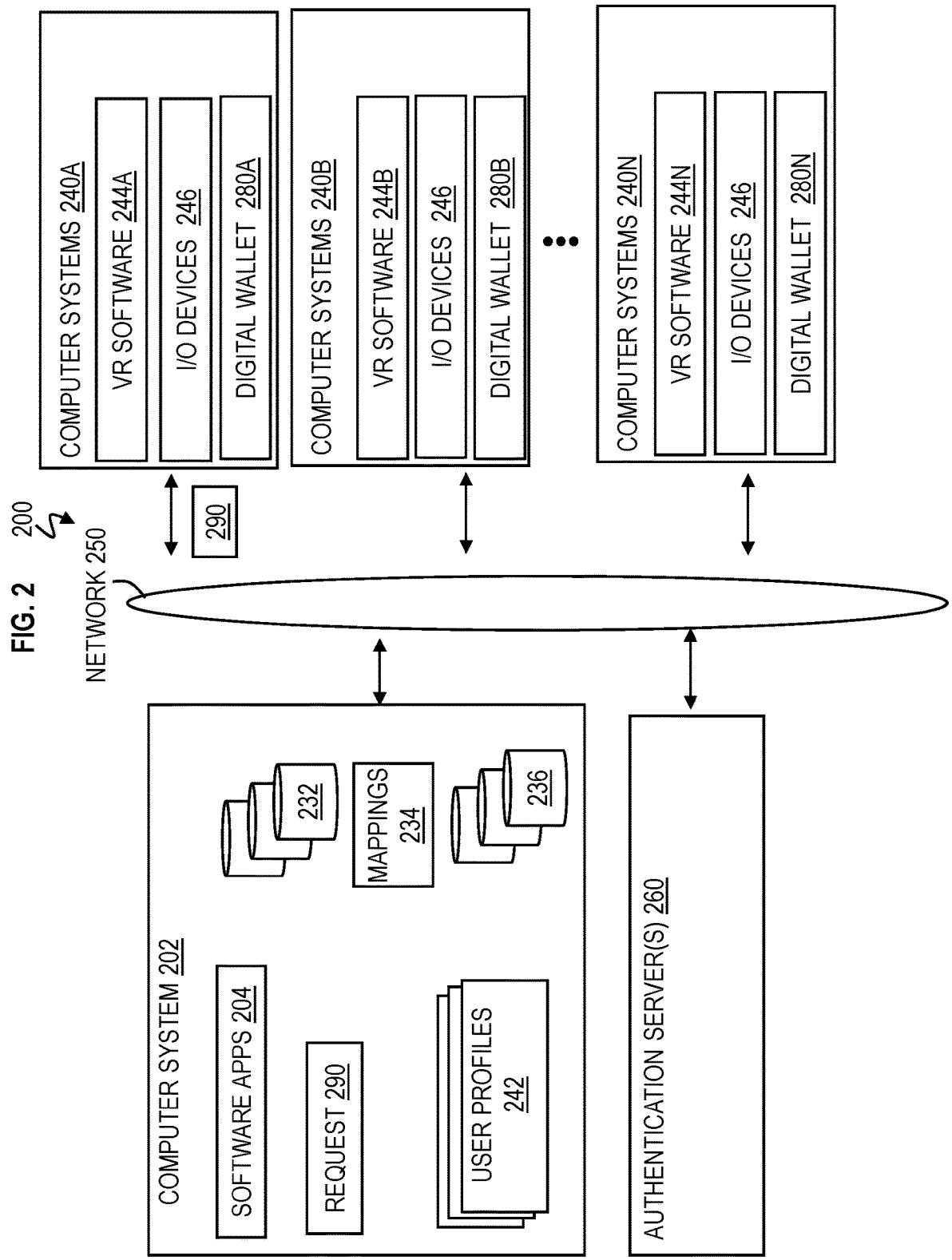
FIG. 2 depicts a block diagram of an example system configured to dynamically removing interactions from a virtual environment thereby executing the right to be forgotten in the virtual environment according to one or more embodiments of the present invention.

FIG. 2 depicts a block diagram of an example system 200 configured to dynamically remove interactions from a virtual environment thereby executing the right to be forgotten in the virtual environment according to one or more embodiments. The system 200 includes computer systems 202 configured to communicate over a network 250 with many different computer systems, such as a computer system 240A for providing the virtual environment to a user, a computer system 240B for providing the virtual environment to a user, through a computer system 240N for providing the virtual environment to a user. The computer systems 240A, 240B, through 240N can generally be referred to as computer systems 240 and are utilized to access the interactive virtual environment including virtual reality, video gaming, etc., offered by the computer systems 202. The network 250 can be a wired and/or wireless communication network.

For explanation purposes and not limitation, some example scenarios of the virtual environment may discuss virtual reality for users. It should be appreciated that one or more embodiments are not limited to examples utilizing virtual reality, and the discussions apply by analogy to any real time interactive communication environment. Some example scenarios may identify a user of computer system 240A as having a user account that controls an avatar in the virtual environment hosted by and/or generated by one or more computer systems 202.

In one or more embodiments, the computer systems 240 can be representative of any type of virtual reality equipment, gaming equipment, and/or electronic device for experiencing a virtual environment, including a virtual reality headset. The computer systems 240A-240N can include various software and hardware components including virtual reality software 244A-244N for virtual reality operations known by one of ordinary skill in the art. The virtual reality software 244A-244N can generally be referred to as virtual reality software 244. Although virtual reality is utilized as an example, the virtual reality software 244 can be representative of gaming software of well-known gaming systems. The computer systems 240 can include one or more input/output (I/O) devices 246 including cameras, a microphone, a display, headsets, smart glasses/googles, virtual reality suits, and other peripherals. The computer systems 240 can be coupled to a controller, such as a handheld controller. The computer system 202, computer systems 240, virtual reality software 244, software applications 204, etc., can include functionality and features of the computer system 100 in FIG. 1 including various hardware components and various software applications such as software 111 which can be executed as instructions on one or more processors 101 in order to perform actions according to one or more embodiments of the invention. The software applications 204 can include, be integrated with, and/or call various other pieces of software, algorithms, application programming interfaces (APIs), etc., to operate as discussed herein. The software applications 204 may be representative of numerous software applications designed to work together. Each of the users of the computer systems 240A-240N have registered with registration and authentication software for a user account in order to utilize the virtual reality services provided by computer system 202, and each of the users has its own user account and its own user profile in user profiles 242. The user profile may record when the user account signs on and signs off the virtual reality, actions taken in virtual reality, contact information including email addresses, usernames, a local address, and phone numbers, and/or locations visited in the interactive communication environment. The user profile may record when a user account is created, who are the friends/followers, the number of friends/followers, etc. The user profile of a user may include the Internet protocol (IP) address of the user, the location of the user, the connected time of the user, etc. The software applications 204 can access and/or include the registration and authentication software in order to control access to the virtual environment.

As noted herein, the computer system 202 may be representative of numerous computer systems and/or distributed computer systems configured to provide virtual reality services to users of the computer systems 240. The computer system 202 can be part of a cloud computing environment such as a cloud computing environment 50 depicted in FIG. 13, as discussed further herein.

The communication in the virtual environment between the computer systems 240 uses end-to-end encryption. Data encryption is the process of using an algorithm that transforms standard text characters into an unreadable format. Data encryption uses keys to scramble data so that only authorized users can read it. End-to-end encryption (E2EE) uses this same process, too. End-to-end encryption takes it a step further by securing communications from one endpoint such as a user terminal to another endpoint such as another user terminal. In many messaging services without end-to-end encryption, third parties store the data from the sender, which is encrypted only in transit to the receiver. This server-side encryption method secures the data from unauthorized viewers only but does not provide end-to-end encryption between the sender and receiver. In the case of end-to-end encryption, encrypted data is only viewable by those with decryption keys. In other words, end-to-end encryption prevents unintended users, including third parties, from reading or modifying data when only the intended readers should have this access and ability.

Features of messaging applications, messenger applications, chat applications, instant messaging applications, etc., are formed of software that enables messages to be sent and received by the computer systems 240. The messages may be text as well as audio and video. In addition to voice calls, video calls, and text, users of messaging applications can send and receive files, images, audio, location data, emojis, documents, etc., via the computer systems 240. In the virtual environment, the virtual software 244 can be utilized to communicate in a group with other users by sending and receiving messages to the entire group in a group chat in a virtual world, room, environment, etc. A group chat is the type of chat that allows users to communicate with multiple people at the same time, for example, each using their respective computer systems 240.

The virtual reality software 244 in cooperation with the software application 204 use end-to-end encryption for messages sent in the virtual environment, such as in a group chat. For end-to-end encryption of the group chat, encrypted data sent from a sender computer system 240 is only viewable by those with decryption keys at the receiver computer systems 240. In other words, end-to-end encryption prevents unintended users, including third parties, from reading or modifying data when only the intended readers should have this access and ability. End-to-end encryption begins with cryptography, a method for protecting information by transforming the information into an unreadable format called ciphertext. Only users who possess a secret key (for example, at the receiver computer systems 240) can decipher or decrypt the message into plaintext. With end-to-end encryption, the sender or creator encrypts the data at the sender computer system 240, and only the intended receiver or reader can decrypt the data at the receiver computer system 240. Asymmetric or public-key cryptography encrypts and decrypts the data using two separate cryptographic keys. The public key is used to encrypt a message at the sender computer system 240 and send it to the public key's owner. Then, the message can only be decrypted using a corresponding private key at the receiver computer system 240, also known as a decryption key. For example, the Transport Layer Security (TLS) encryption protocol keeps third parties from intercepting messages in transit.

Further, the software application 204 can utilize a cryptographic key called an ephemeral key that is generated for each execution of a key establishment process that meets requirements of the key type (e.g., unique to each message, session, conversation, period of time, etc.).

The messaging functionality incorporated in the virtual reality software 244 can utilize any suitable end-to-end encryption method for group chats as known by one of ordinary skill in the art. In one or more embodiments, via software applications 204 of the host computer systems 204, the virtual reality software 244 can communicate with one another using the Signal Protocol (formerly known as the TextSecure Protocol). The signal protocol is a non-federated cryptographic protocol that provides end-to-end encryption for voice and instant messaging conversations. The signal protocol provides confidentiality, integrity, authentication, participant consistency, destination validation, forward secrecy, post-compromise security (aka future secrecy), causality preservation, message unlinkability, message repudiation, participation repudiation, and asynchronicity. The signal protocol also supports end-to-end encrypted group chats. The group chat protocol may be a combination of a pairwise double ratchet and multicast encryption. In addition to the properties provided by the one-to-one protocol, the group chat protocol provides speaker consistency, out-of-order resilience, dropped message resilience, computational equality, trust equality, subgroup messaging, as well as contractible and expandable membership.

FIG. 3A is a flowchart of a computer-implemented method 300 for dynamically executing cybercommunication procedures to remove interactions from a virtual environment thereby providing a software tool for executing the right to be forgotten in the virtual environment and deleting interactions by a user in the virtual environment according to one or more embodiments. The computer-implemented method 300 is executed by the computer system 202. Reference can be made to any figures discussed herein.

At block 302 of the computer-implemented method 300, one or more software applications 204 of computer system 202 are configured to create an account for a user that is to utilize the provided services in the virtual environment. In one or more embodiments, the user can utilize a username, password, email account, etc., to create a user account for services in the virtual environment. In one or more embodiments, the software applications 204 can use the digital wallet of a user to create the account for utilizing the services in the virtual environment. Each of the users can have its own unique digital wallet 280A-280N, which can generally be referred to as digital wallet 280. Digital wallets can include information about a person. Digital wallets 280 can include cryptocurrency wallets, such as the METAMASK® digital wallet, that store a user's public and private keys for cryptocurrency and for exchange of cryptocurrency on the blockchain. In one or more embodiments, the digital wallet, for example, a cryptocurrency wallet, can be utilized as the base to create encryption keys in the virtual environment.

The software applications 204 can generate the cryptographic keys such as a public key and private key for the newly created user account of the user. In one or more embodiments, the software applications 204 can cause the public key and private key to be generated based on the digital wallet. A user profile 242 can be created for the user account of each participant registered to utilize the services provided by the computer systems 202 in the virtual environment. In some cases, authentication servers 260 may be utilized to authenticate the users when entering the virtual environment.

At block 304, one or more software applications 204 are configured to generate a user identification/identifier for the user in which the user identification is to be appended to user keys in the virtual environment. The user identification of the user can be utilized to identify the user keys (e.g., public keys) for messages sent by the user in the virtual environment as discussed herein. The user identification is intended to be unique. In one or more embodiments, the user identification is based on the unique cryptographic public key of the digital wallet 280 for the user. In one or more embodiments, the user identification is based on the unique address of the digital wallet 280 for the user. In one or more embodiments, the user identification can be based on any unique feature of the digital wallet 280. In one or more embodiments, the user identification can a randomly generated value.

At block 306, one or more software applications 204 are configured to receive a new message input by the user via the virtual reality software 244 and prepare the new message to send/post in the virtual environment by embedding the user identification with the cryptographic keys (e.g., public keys) of recipients in the virtual environment. The software applications 204 can cause cryptographic keys to be generated and/or generate cryptographic keys, such as public and private keys for each of the user, for each chat in the virtual environment. In one or more embodiments, the software applications 204 can generate cryptographic keys (e.g., public and private keys) for each virtual world, room, environment, etc., in the virtual environment. As a user traverses from one virtual world, room, environment, etc., in the virtual environment to another, the user can be provided with different cryptographic public and private keys specific to that location in the virtual environment. The user identification is not utilized for encryption.

FIG. 4A depicts an example 402 of embedding a user identification/identifier (ID) of a sender user (e.g., the user of computer system 240A) with an example public key of a particular recipient user according to one or more embodiments. As noted herein, the user signs every message using the public key of each intended recipient user, such that the recipient can decrypt the message using its private key. Accordingly, each conversation (chat) has a unique pair of keys (public and private). FIG. 4A illustrates an example of appendix mode. In FIG. 4A, the software applications 204 are configured to add an example user identification 406 of the sender at the beginning of both keys, like a password salt. In one or more embodiments, the user identification 406 could be added at the end. FIG. 4A illustrates the software applications 204 adding the user identification 406 to an example key 404, resulting in a final key 408 that includes both the user identification 406 and the key 404. This enables the software applications 204 to search and find the user identification of messages sent by a given sender. It is noted that the message itself remains encrypted and secure, and this method of embedding only provides a mechanism to identify who sent and who received the message; this is done anonymously because there is no traceability between the user and the keys. FIG. 4A illustrates an example 402 for an example recipient user but applies to numerous recipient users. For example, the user identification 406 could be for the sender user of computer system 240A. Although the example 402 in FIG. 4A illustrates embedding the user identification 406 for a single key corresponding to a single recipient user of a message, the embedding process is respectively applied to the public keys for each of the recipient users of the computer systems 240B-240N that are going to be sent the new message in accordance with one or more embodiments.

Analogous to FIG. 4A, FIG. 4B depicts an example 412 of embedding a user identification/identifier (ID) of a sender user (e.g., the user of computer system 240A) with an example public key of a particular recipient user according to one or more embodiments. Again, the user signs every message using the public key of each recipient user. Also, it is noted that for security each conversation (chat) has a unique pair of keys (public and private). FIG. 4B illustrates an example of binary sum mode. In FIG. 4B, the software applications 204 are configured to convert the user identification into a binary form of the example user identification 416 of the sender at the beginning of both keys, like a password salt. Again, the user identification 416 could be added to the end, in one or more embodiments. FIG. 4B illustrates the software applications 204 adding the user identification 416 in binary form to an example key 404, resulting in a final key 418 that includes both the user identification 416 and the key 404. This enables the software applications 204 to search and find the identification of messages sent by a given sender. It is noted that the message itself remains encrypted and secure, and this method of embedding only provides a mechanism to identify who sent and who received the message; this is done anonymously because there is no traceability between the user identification and the keys. Although the example 412 in FIG. 4B illustrates embedding the user identification 416 for a single key corresponding to a single recipient user of a message, the embedding process is applied to the public keys for each of the recipient users of the computer systems 240B-240N that are going to be sent the new message in accordance with one or more embodiments.

Referring back to FIG. 3, at block 308, one or more software applications 204 are configured to send the new message signed with the respective cryptographic keys of the recipient users where each of the cryptographic keys has been embedded with the (same) user identification 406 of the sender user in the virtual environment. Each message sent by the sender user (e.g., the user of computer system 240A) is to have the respective cryptographic keys of the recipient embedded with the user identification 406 of the sender user.

Figure 5:
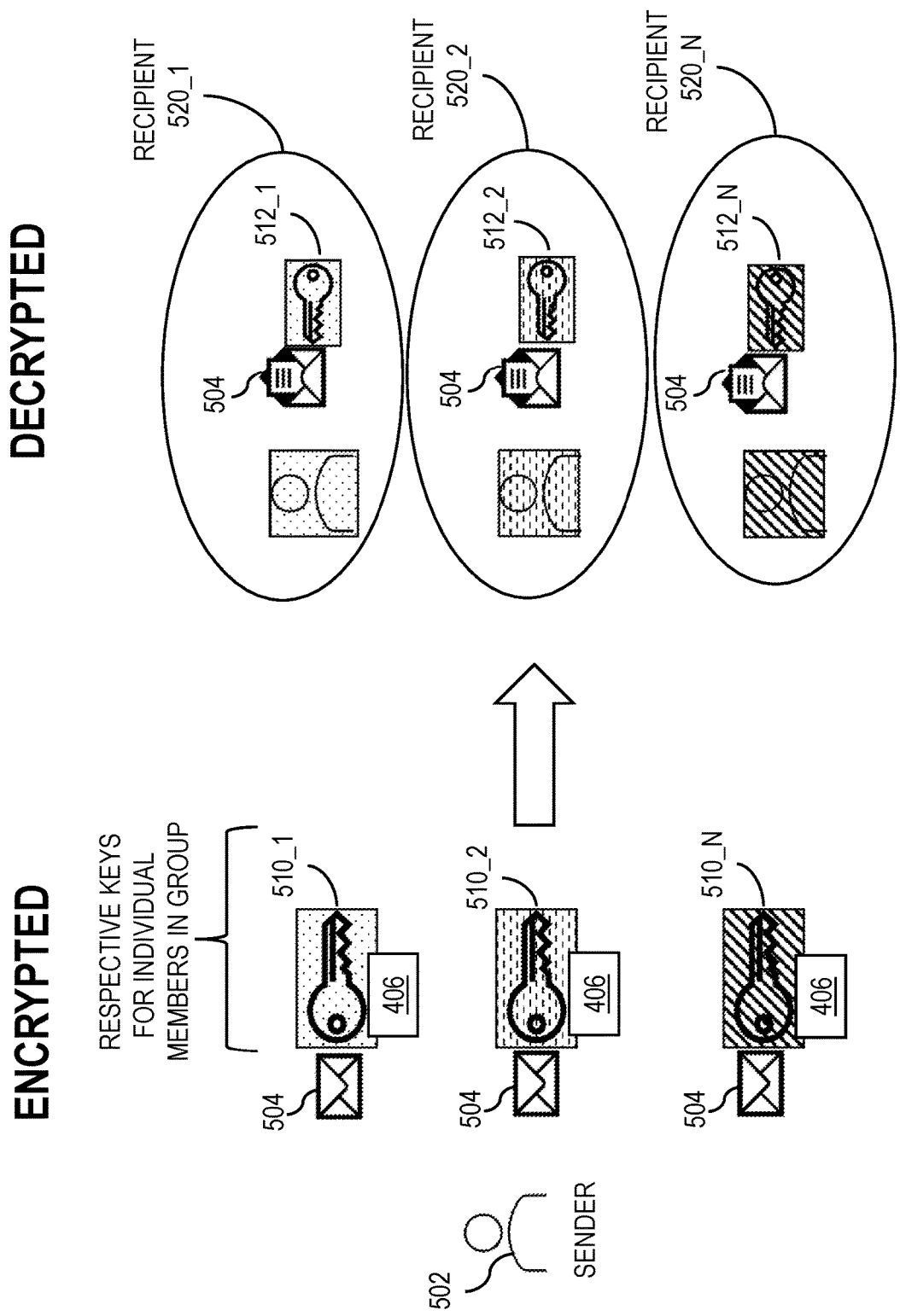
FIG. 5 depicts an example of sending a new message to recipients in a virtual environment using end-to-end encryption with cryptographic keys of recipients embedded a user identification/identifier of a sender user according to one or more embodiments of the present invention.

FIG. 5 depicts an example for sending a new message to recipients in a virtual environment using end-to-end encryption with the user identification embedded in the cryptographic keys. In FIG. 5, a sender 502 using, for example, the computer system 240A, sends a new chat message 504 to all users in a virtual world, room, environment, etc., in the virtual environment. As seen in FIG. 5, upon sending the new message 504, the software applications 204 are configured to use a fan-out approach every time a user sends a message to the group, such that the software applications 204 encrypt each new message 504 separately using the individual public key for each user and embeds the user identification (e.g., user identification 406) in each public key for the recipient users. A distinctively encrypted new chat message 504 embedded with the user identification 406 is sent to each recipient 520_1, 520_2, and 520_N, where the recipients are members accessing the virtual environment using their respective computer systems 240. Upon receipt of the new message 504, each of the recipient users can use its own (secret) private key to decrypt the new message 504. For example, a public key 510_1 is used to encrypt the new message 504 for a recipient 520_1 that uses its corresponding private key 512_1 to decrypt the new message 504 on the computer system 240. Likewise, a public key 510_2 is used to encrypt the new message 504 for a recipient 520_2 that uses its corresponding private key 512_2 to decrypt the new message 504 on the computer system 240. Similarly, a public key 510_N is used to encrypt the new message 504 for a recipient 520_N that uses its corresponding private key 512_N to decrypt the new message 504 on the computer system 240. Although the encrypted messages 504 may pass through one or more host computer systems 202, the computer system 202 cannot read the encrypted messages 504, because each of the computer systems 240 has its own private key to respectively decrypt the encrypted message 504. Each time the virtual reality software 244 receives a new group chat message, the virtual reality software 244 applies its own (unique) private key to the received new group chat message in order to decrypt the received new group chat message. The virtual reality software 244 has advance knowledge of the position of the user identification 406. The virtual reality software 244 is configured to remove the user identification 406 before decrypting the message with the private key. In one or more embodiments, the virtual reality software 244 is configured to ignore or skip over the user identification 406 during the decryption.

The computer systems 202 can maintain numerous repositories 232 with the public keys for the various users of the virtual environment. Within the virtual environment, there can different public keys generated for different virtual worlds, rooms, environments, etc.

Figure 3:
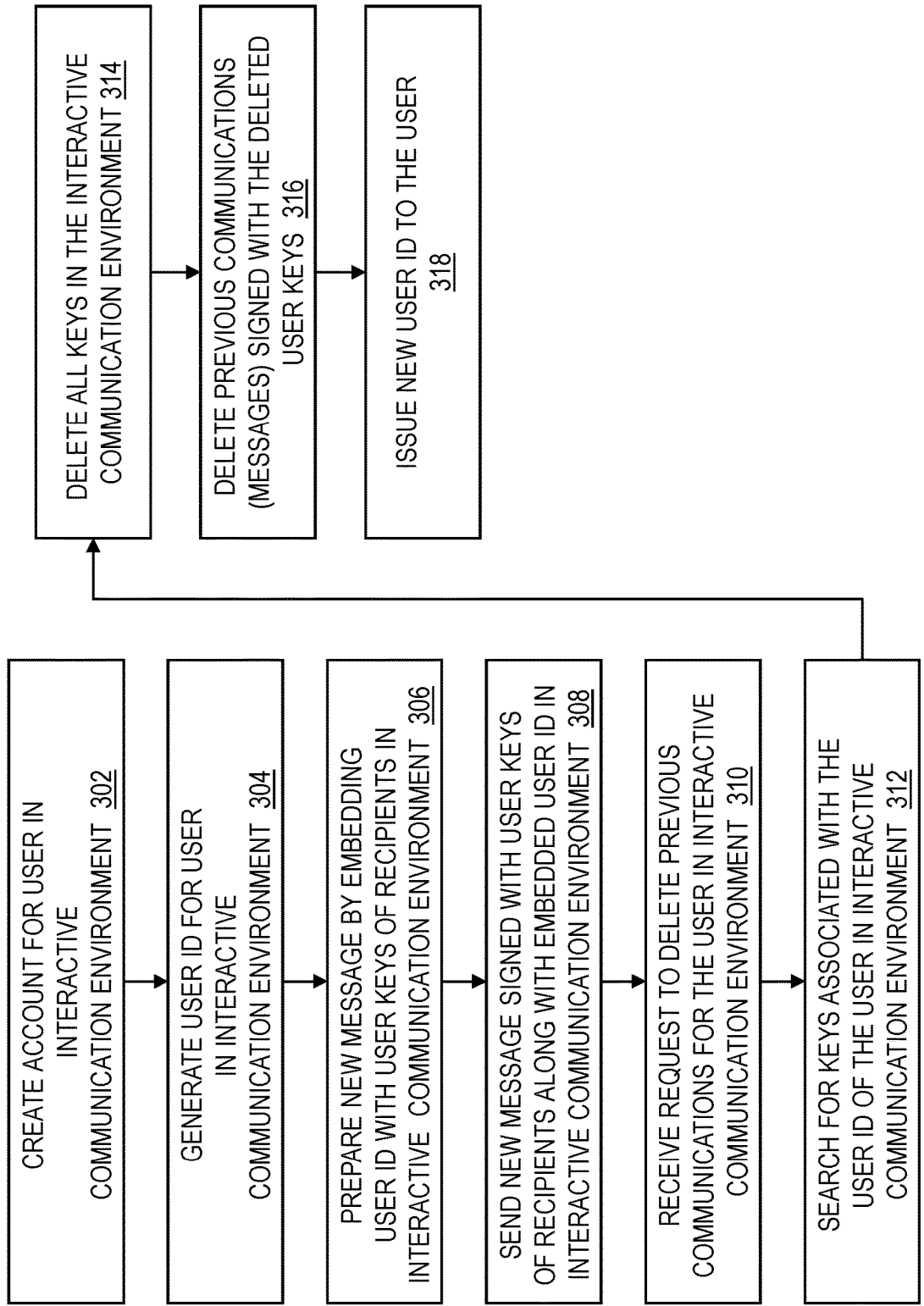
FIG. 3 is a flowchart of a computer-implemented method for dynamically removing interactions from a virtual environment thereby executing the right to be forgotten in the virtual environment according to one or more embodiments of the present invention.
Figure 6:
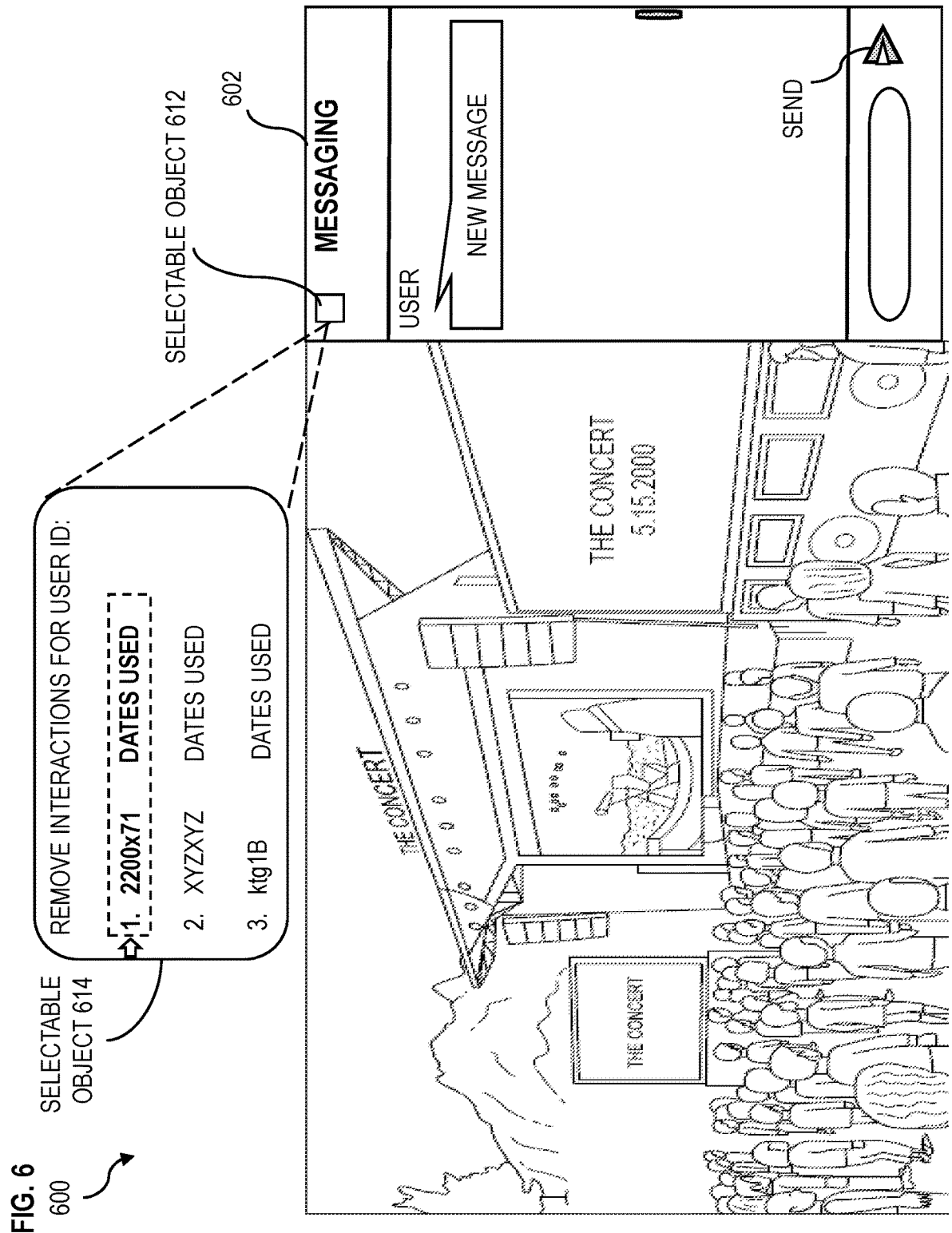
FIG. 6 depicts an example virtual environment in which a user can interact according to one or more embodiments of the present invention.

Referring to FIG. 3, at block 310, one or more software applications 204 are configured to receive a request 290 and/or user input to delete previous interactions for the user in the virtual environment. FIG. 6 depicts an example virtual environment 600 in which a user can interact. The user can access the virtual environment 600 using the virtual reality software 244, which can be via a host website, a mobile app, an application programming interface, etc. In the virtual environment 600, the user can send messages to and receive messages from other users by utilizing, for example, a displayed chat object 602. The users can be represented by avatars or any kind of virtual object in the virtual environment 600. The user could be visiting a particular virtual world, room, environment, etc., such as a virtual concert along with other users in the virtual environment 600. In the virtual environment 600, the user can visit and send/post messages in numerous virtual worlds, rooms, environments, etc., using public keys (of the other users) embedded with the user identification 406 as discussed herein. The software applications 204 are configured to sign or encrypt the new message with the public keys of the recipient users along with the embedded user identification 406 as discussed in FIG. 5. In FIG. 6, the user can request to delete interactions in the virtual environment 600 according to one or more embodiments. In one or more embodiments, the software applications 204 are configured to receive a selection of a selectable object 612 of the chat object 602 displayed in a graphical user interface for the user. Upon selection of the selectable object 612, the software applications 204 cause a selectable object 614 to be displayed to the user in which the selectable object 614 shows the user identifications that were embedded with public keys for messages sent by the user in the virtual environment 600. If only one user identification has been utilized by the user in the virtual environment 600, then a single user identification is displayed to the user in the selectable object 614. However, for illustration purposes, the selectable object 614 lists that three user identifications have been embedded with public keys of recipients for messages sent by the user. In this example, the user selects the first user identification (e.g., the user identification 2200x71) to be removed. In one or more embodiments, the second user identification or third user identification could have been selected for removal in the virtual environment. In one or more embodiments, each of the user identifications displayed in the selectable object 614 could have been currently selected for removal in the virtual environment. In one or more embodiments, the dates through which a user identification was utilized, active, etc., are displayed in the selectable object 614. As such, the user can select a given user identification based on the dates used.

In one or more embodiments, the software applications 204 are configured to display preferences to the user for deleting previous interactions, where the preferences allow the user to set triggers as the request 290 to remove previous interactions associated with the user identification in the virtual environment. For example, triggers to delete previous interactions associated with a given user identification can include upon exiting/leaving a virtual world, room, environment, etc., in the virtual environment 600, upon logging off the virtual services, upon logging in the virtual services, at the expiration of a predefined period of time, after a predetermined interactions have been sent/posted, etc.

Referring back to FIG. 3, at block 312, one or more software applications 204 are configured to, in response to the selection of the user identification, search for cryptographic keys (e.g., public keys) associated with the selected user identification of the user in the virtual environment, which can be multiple user identifications. As noted herein, the computer systems 202 can have repositories 232 storing numerous public keys for the various users of the virtual environment. The stored public keys have been utilized to send messages across the entire virtual environment in numerous virtual worlds, rooms, environments, etc. The software applications 204 are configured to search the repositories 232 for the public keys that are embedded with the selected user identification(s). There are public keys embedded with other user identifications for other users. In one or more embodiments, when searching for the selected user identification, the software applications 204 are configured to parse each public key for the first predefined number of digits, bits, and/or values, without having to search the remainder of the public key. In one or more embodiments, the user identification can be embedded as a prefix to the cryptographic public key, and the software applications 204 are configured to parse the prefix of each public key to find the selected user identification. In one or more embodiments, the user identification can be embedded as a suffix (e.g., the last predefined number of digits, bits, and/or values) to the cryptographic public key, and the software applications 204 are configured to parse the suffix of each public key to find the selected user identification.

Now turning to FIG. 7, depicted is an example of searching the cryptographic public keys for the selected user identification according to one or more embodiment. FIG. 7 represents the software applications 204 searching various public keys for the example user identification 2200x71, and the public keys have been identified with the user identification 2200x71 in the virtual environment. Although two example public keys are illustrated as being identified in FIG. 7, there can be hundreds, thousands, etc., of public keys located with the user identification 2200x71. The identified public keys can be associated with messages sent by the user across the entire virtual environment, for example, in numerous virtual worlds, rooms, environments, etc. The associated messages are still available for view in the virtual environment, although there could be hundreds, thousands, etc., other messages in the same group chat and/or in various group chats in the virtual environment. Once the cryptographic keys having the user identification 2200x71 are found, the cryptographic keys embedded with the user identification 2200x71 are to be deleted as discussed herein.

Referring back to FIG. 3, at blocks 314 and 316, one or more software applications 204 are configured to delete all the identified public keys embedded with the selected user identification from the virtual environment and delete previous interactions (e.g., messages) signed with the deleted public keys from the virtual environment. Since each message is signed with a public key, the software applications 204 are configured to identify both the public key having the selected user identification along with the message sent by the sender user. In one or more embodiments, each identified public key embedded with the selected user identification is mapped to its corresponding message in, for example, a mapping database 234. In one or more embodiments, the identified public keys embedded with the selected user identification are stored together with their respective signed messages in repositories 236. At block 318, one or more software applications 204 are configured to issue a new user identification to the user such that the user can send new messages having their cryptographic keys embedded with the new user identification in the virtual environment.

Figure 8:
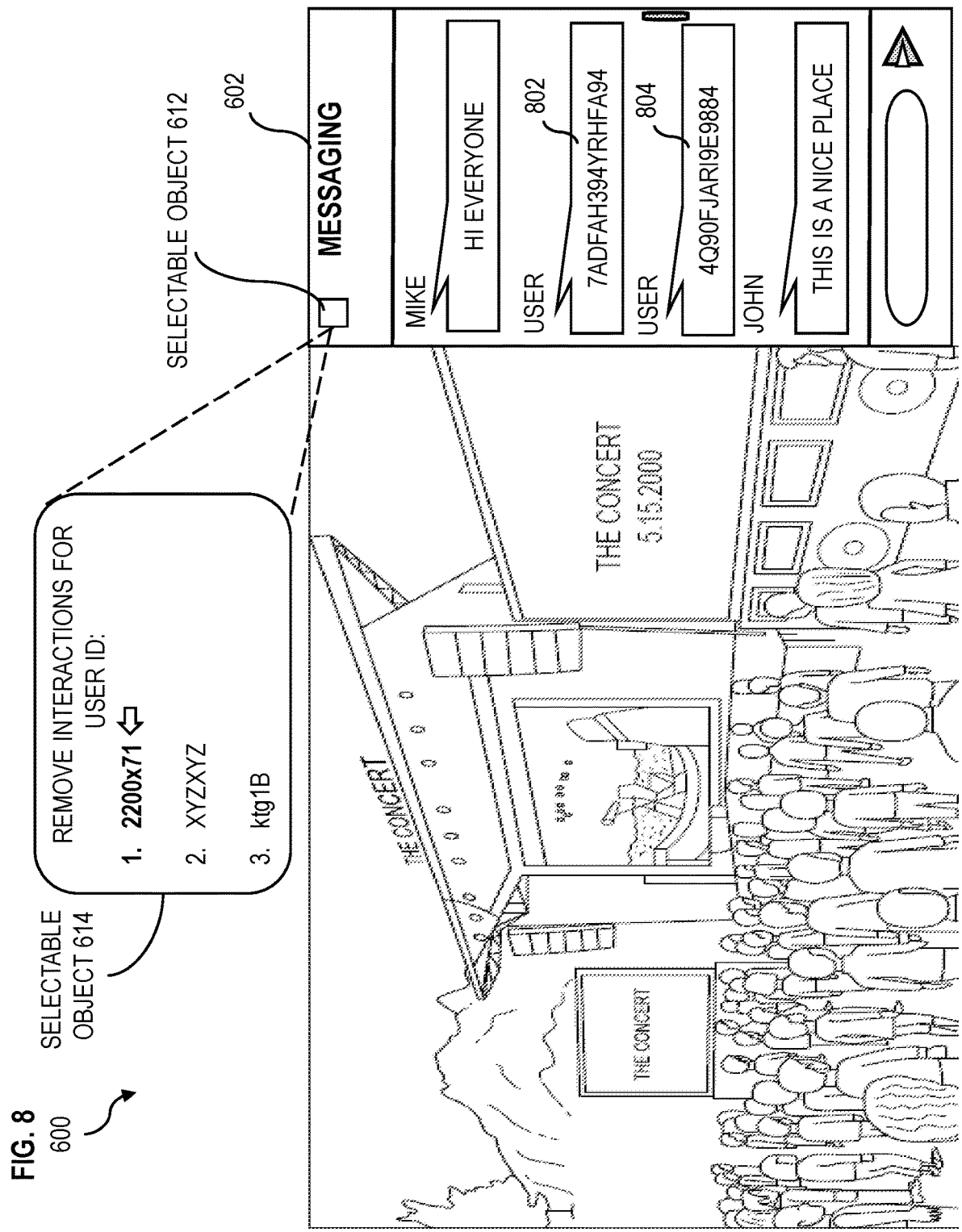
FIG. 8 depicts an example of a virtual environment after deleting the public keys embedded with a selected user identification according to one or more embodiments of the present invention.

FIG. 8 depicts an example of the virtual environment 600 after deleting the public keys embedded with the selected user identification according to one or more embodiments. In FIG. 8, once the public keys used to encrypt the messages from the user are deleted, the software applications 204 are configured to display messages from the user, such as messages 802 and 804, where the content is illegible in the chat object 602 in the virtual environment 600. In one or more embodiments, the software applications 204 can send instructions that cause the virtual reality software 244 to display messages from the user, such as messages 802 and 804, where the content is illegible in the chat object 602 in the virtual environment 600.

Figure 9:
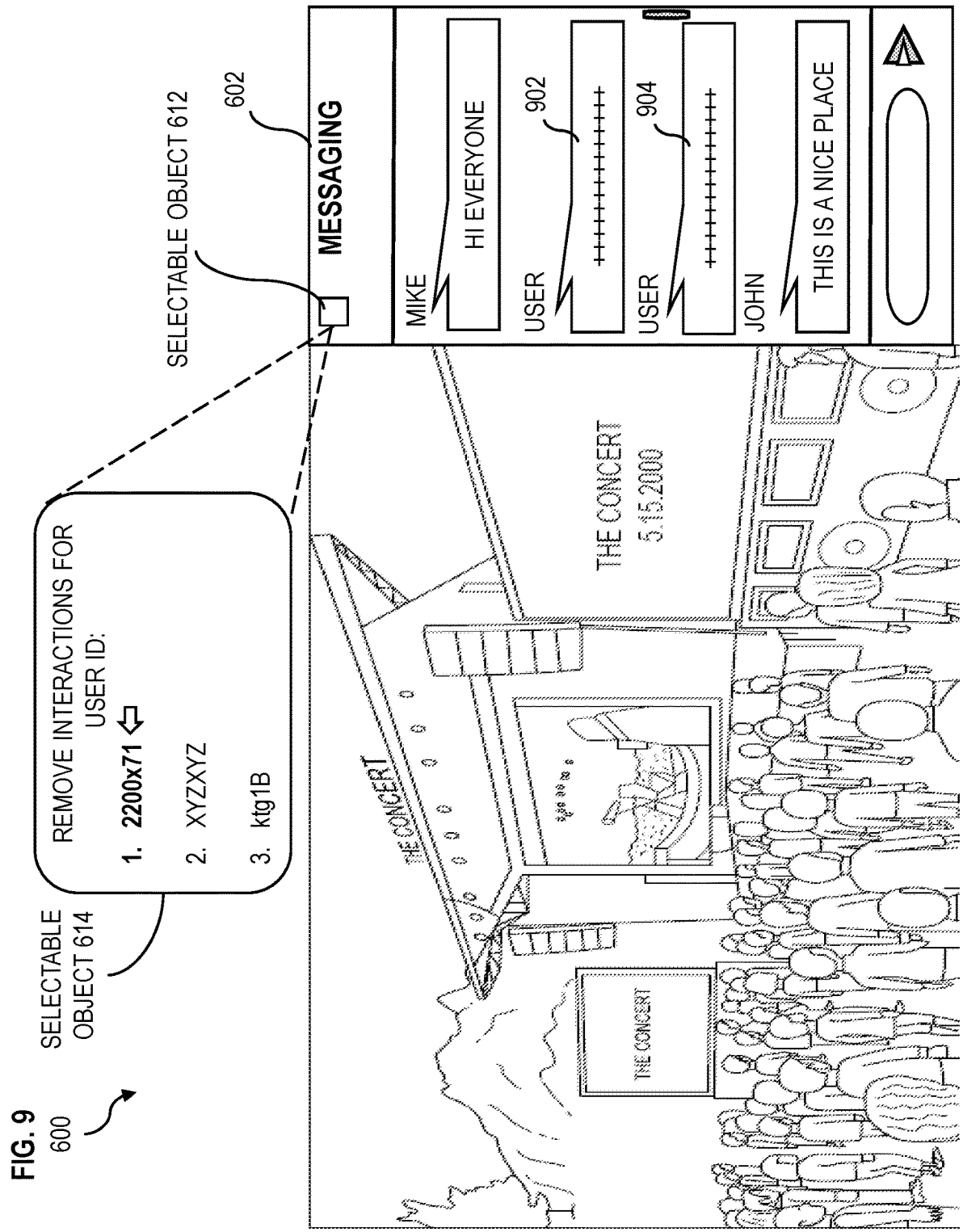
FIG. 9 depicts an example of a virtual environment after deleting the public keys embedded with a selected user identification according to one or more embodiments of the present invention.

FIG. 9 depicts an example of the virtual environment 600 after deleting the public keys embedded with the selected user identification according to one or more embodiments. In FIG. 9, once the public keys used to encrypt the messages from the user are deleted, the software applications 204 are configured to replace the content of the encrypted messages with a mask such that masked messages 902 and 904 are displayed in the chat object 602 in the virtual environment 600. In one or more embodiments, the software applications 204 can send instructions that cause the virtual reality software 244 to replace the content of the encrypted messages with a mask such that masked messages 902 and 904 are displayed in the chat object 602 in the virtual environment 600.

Figure 10:
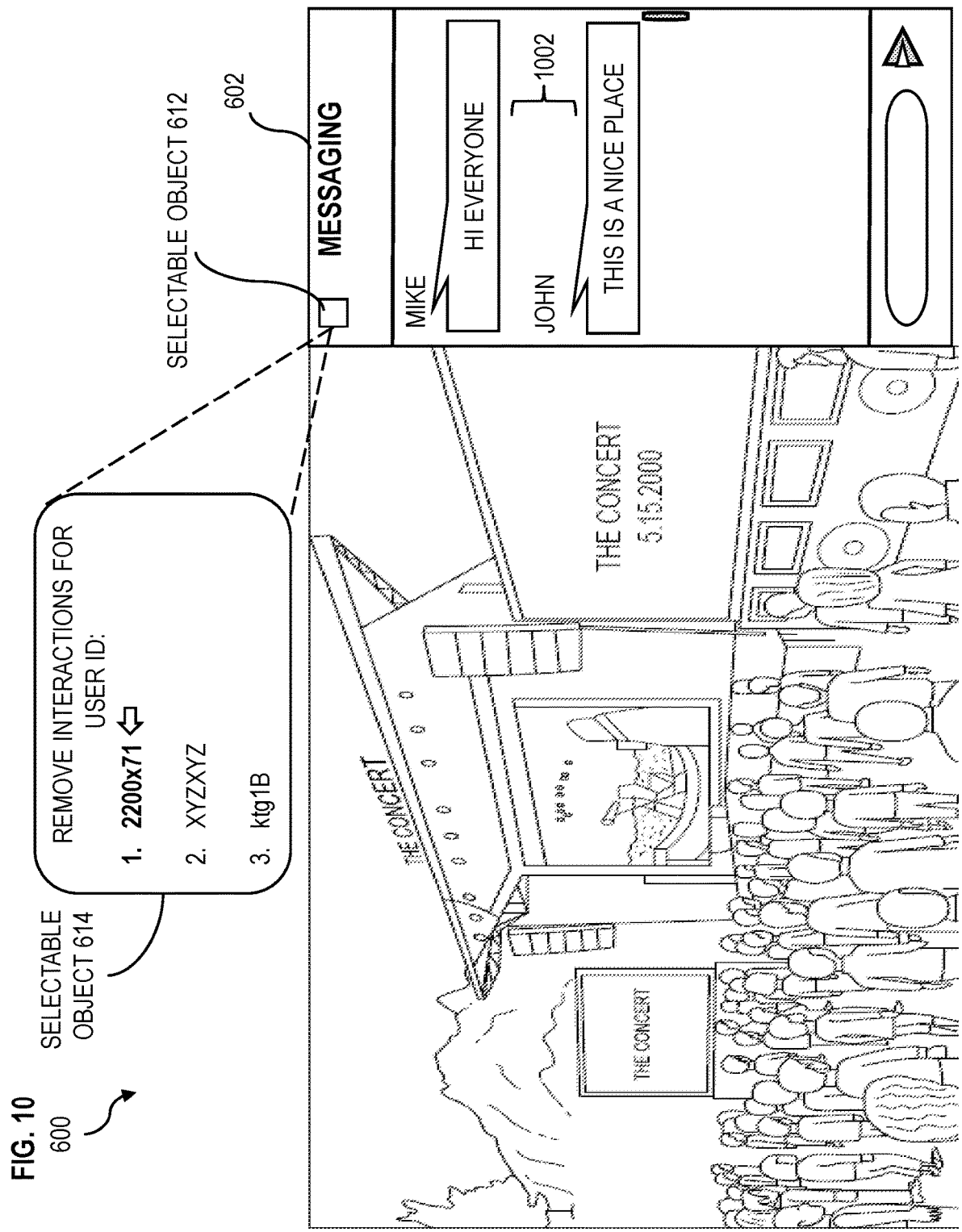
FIG. 10 depicts an example of a virtual environment after deleting the public keys embedded with a selected user identification according to one or more embodiments of the present invention.

FIG. 10 depicts an example of the virtual environment 600 after deleting the public keys embedded with the selected user identification according to one or more embodiments. In FIG. 10, once the public keys used to encrypt the messages from the user are deleted, the software applications 204 are configured to delete the messages signed by the deleted public keys and display no previous location of the deleted messages in the chat object 602 in the virtual environment 600. That is, the displayed view in the virtual environment 600 shows the chat object 602 as though no message 1002 was ever sent to the other recipients, and there is no notice or indication of deleted messages, as depicted in FIG. 10. FIG. 10 provides a clean chat. In one or more embodiments, the software applications 204 can send instructions that cause the virtual reality software 244 to delete the messages signed by the deleted public keys and display no previous location of the deleted messages in the chat object 602 in the virtual environment 600

Figure 11:
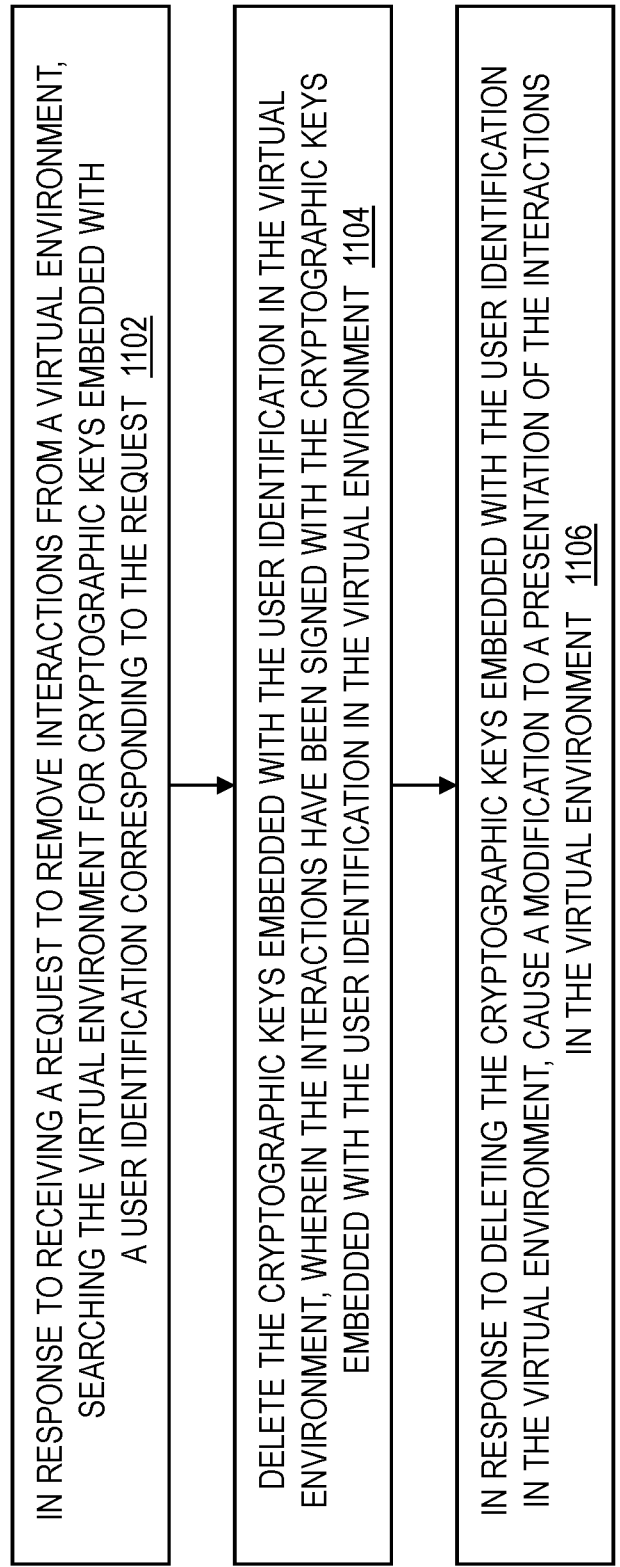
FIG. 11 is a flowchart of a computer-implemented method for removing interactions from a virtual environment thereby executing the right to be forgotten in the virtual environment and providing privacy in the electronic virtual environment according to one or more embodiments of the present invention.

FIG. 11 is a flowchart of a computer-implemented method 1100 for removing interactions from a virtual environment thereby executing the right to be forgotten in the virtual environment and providing privacy in the electronic virtual environment according to one or more embodiments. Reference can be made to any of the figures discussed herein.

At block 1102 of the computer-implemented method 1100, one or more software applications 204 are configured to, in response to receiving a request 290 (e.g., from the computer system 240A) to remove interactions from a virtual environment, search the virtual environment for cryptographic keys embedded with a user identification 406 corresponding to the request 290. Using, for example, the virtual reality software 244A, the request 290 can be generated by the user selecting the desired user identification in the selectable object 614, as depicted in FIG. 6. The request 290 corresponds to user input that provides instructions to the one or more software applications 204. The software applications 204 can search for the cryptographic keys embedded with the user identification 406, as depicted in FIG. 7.

At block 1104, one or more software applications 204 are configured to delete the cryptographic keys embedded with the user identification 406 in the virtual environment, where the interactions have been signed with the cryptographic keys embedded with the user identification 406 in the virtual environment. The software applications 204 can delete the identified cryptographic keys embedded with the user identification 406 from the repositories 232. The deleted cryptographic keys relate to interactions sent, posted, performed, etc., in the virtual environment by the user, for example, of computer system 240A that made the request 290.

At block 1106, one or more software applications 204 are configured to, in response to deleting the cryptographic keys embedded with the user identification in the virtual environment, causing a modification to a presentation of the interactions in the virtual environment.

In one or more embodiments, the software applications 204 are configured to cause the cryptographic keys embedded with the user identification to be deleted from user terminals coupled to the virtual environment. In response to receiving the request 290 from the computer system 240A, the software applications 204 sends instructions to, for example, virtual reality software 244B-244N to delete the identified cryptographic keys embedded with the user identification from respective computer systems 240B-240N.

The user identification 406 anonymously corresponds to a user (e.g., the user of computer system 240A) in the virtual environment. The user identification 406 is not displayed in the virtual environment. The user identification 406 is different from a username that is displayed in the virtual environment. For example, the user identification 406 is embedded with cryptographic keys, which are not displayed in the virtual environment. The user identification 406 is utilized as part of backend services just as the cryptographic keys and can operate with an encryption protocol. As a modification to the encryption protocol, the user identification 406 can be removed before decryption and/or during the decryption process. The user identification 406 is distinct and different from usernames, avatar names, handles, etc., displayed in the virtual environment.

In one or more embodiments, causing the modification to the presentation of the interactions in the virtual environment comprises deleting messages sent with the cryptographic keys embedded with the user identification from the virtual environment. For example, FIG. 10 depicts the deletion of messages sent with the identified cryptographic keys embedded with the user identification. Causing the modification to the presentation of the interactions in the virtual environment comprises obfuscating messages sent with the cryptographic keys embedded with the user identification in the virtual environment. For example, FIGS. 8 and 9 depict the obfuscation of messages sent with the cryptographic keys embedded with the user identification.

In one or more embodiments, the software applications 204 are configured to provide a new user identification for upcoming messages and embed the new user identification with other cryptographic keys that are utilized to sign the upcoming messages. New messages can be sent with cryptographic keys embedded with the new user identification, as depicted in FIG. 5.

Figure 12:
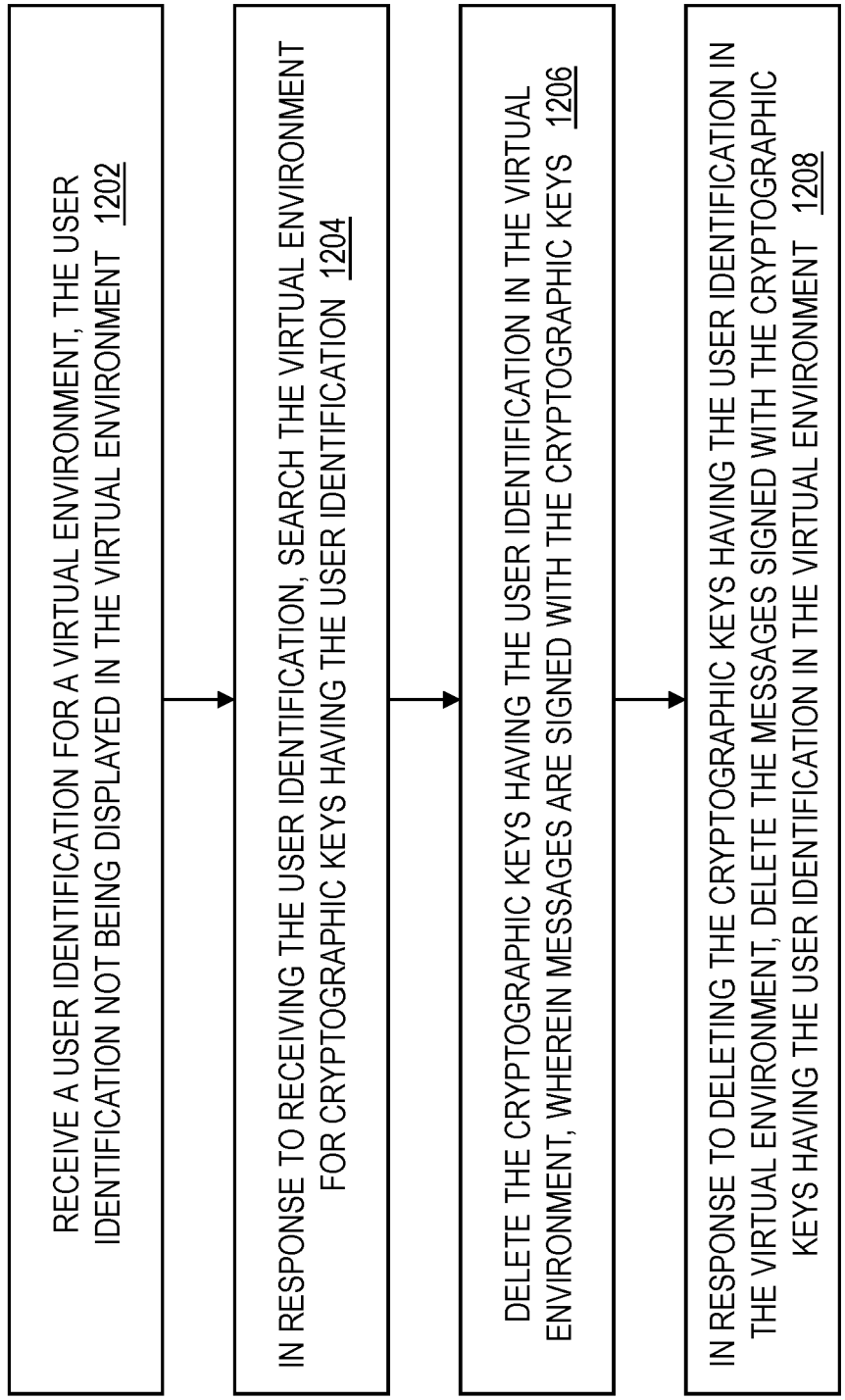
FIG. 12 is a flowchart of a computer-implemented method for removing interactions from a virtual environment thereby executing the right to be forgotten in the virtual environment and providing privacy in the electronic virtual environment according to one or more embodiments of the present invention.

FIG. 12 is a flowchart of a computer-implemented method 1200 for removing interactions from a virtual environment thereby executing the right to be forgotten in the virtual environment and providing privacy in the electronic virtual environment according to one or more embodiments. Reference can be made to any of the figures discussed herein.

At block 1202 of the computer-implemented method 1200, one or more software applications 204 are configured to receive a user identification 406 for a virtual environment, the user identification not being displayed in the virtual environment. Receipt of the user identification 406 can act as a request 290 to delete messages for a user. The user identification 406 can be received as user input by a user, for example, as depicted in FIG. 6.

At block 1204, one or more software applications 204 are configured to, in response to receiving the user identification 406, search the virtual environment for cryptographic keys having the user identification 406. The software applications 204 can search for the cryptographic keys embedded with the user identification 406, as depicted in FIG. 7.

At block 1206, one or more software applications 204 are configured to delete the cryptographic keys having the user identification in the virtual environment, where messages are signed with the cryptographic keys. For example, the software applications 204 can delete the identified cryptographic keys embedded with the user identification 406 from the repositories 232.

At block 1208, one or more software applications 204 are configured to, in response to deleting the cryptographic keys having the user identification in the virtual environment, delete the messages signed with the cryptographic keys having the user identification in the virtual environment. For example, the messages signed with the cryptographic keys having the user identification are deleted from the repositories 236. In response to receiving the user identification 406 from the computer system 240A, the software applications 204 sends instructions to, for example, virtual reality software 244B-244N to delete the identified cryptographic keys embedded with the user identification from respective computer systems 240B-240N.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
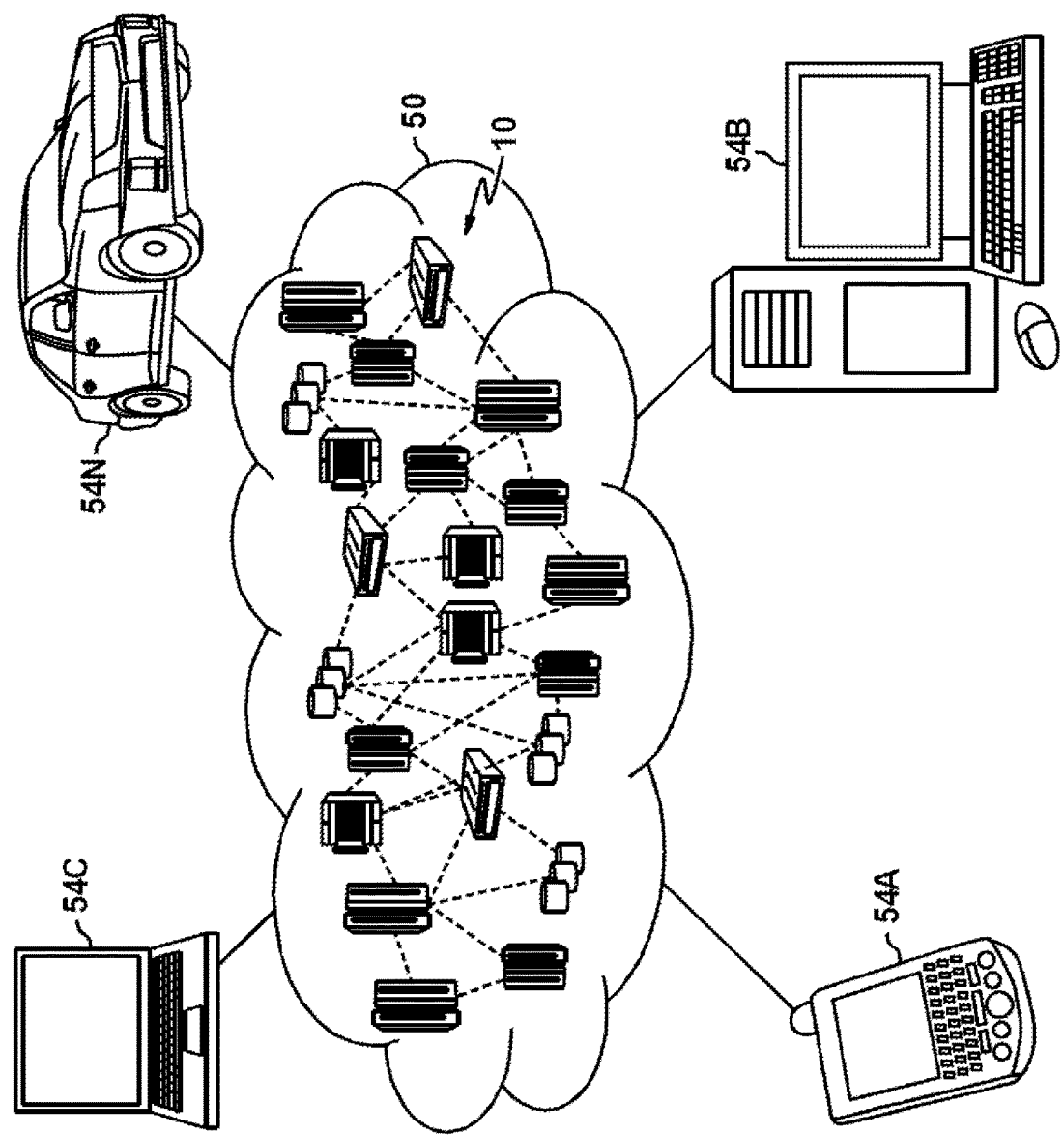
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
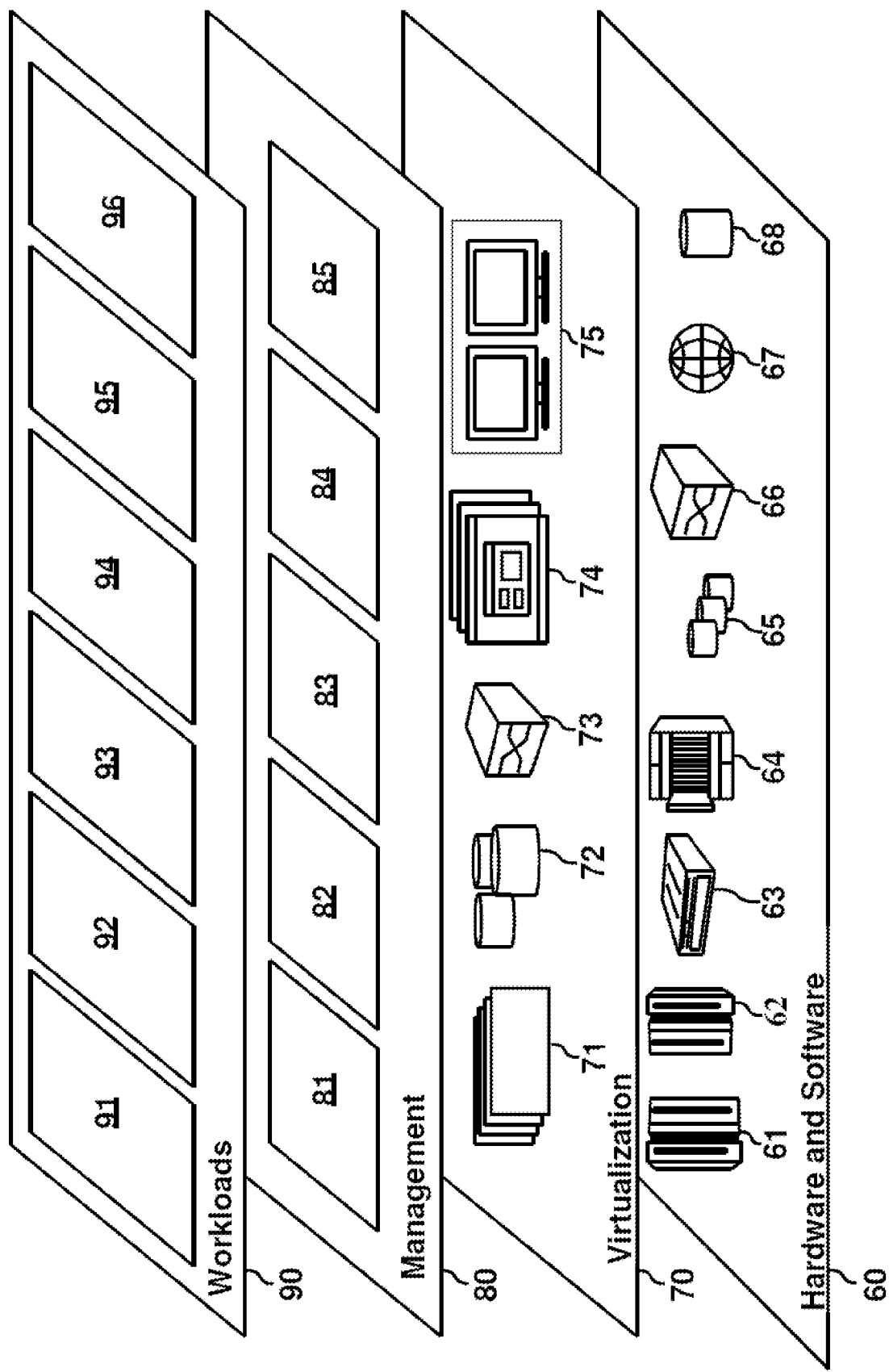
FIG. 14 depicts abstraction model layers according to one or more embodiments of the present invention.

Referring now to FIG. 14, a set of functional abstraction layers provided by cloud computing environment 50 (depicted in FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   in response to receiving a request to remove interactions from a virtual environment, searching the virtual environment for cryptographic keys embedded with a user identification corresponding to the request, wherein the user identification is appended to the cryptographic keys of a user to uniquely correspond to the user;
   displaying a username of the user in the virtual environment, the username being different from the user identification, wherein the user identification fails to be displayed in the virtual environment, wherein the searching the virtual environment comprises searching for the user identification in the virtual environment;
   in response to finding the user identification in the virtual environment, deleting the cryptographic keys embedded with the user identification in the virtual environment, wherein the interactions have been signed with the cryptographic keys embedded with the user identification in the virtual environment; and
   in response to deleting the cryptographic keys embedded with the user identification in the virtual environment, causing a modification to a presentation of the interactions in the virtual environment, wherein causing the modification to the presentation of the interactions in the virtual environment comprises obfuscating and deleting messages sent with the cryptographic keys appended with the user identification from the virtual environment.

2. The computer-implemented method of claim 1, further comprising causing the cryptographic keys embedded with the user identification to be deleted from user terminals coupled to the virtual environment based on the user identification being found during the searching.

3. The computer-implemented method of claim 1, wherein:
   the user identification anonymously corresponds to the user in the virtual environment for one or more first dates;
   a second user identification anonymously corresponds to the user in the virtual environment for one or more second dates different from the one or more first dates; and
   the user identification or the second user identification is selected to be appended to the cryptographic keys.

4. The computer-implemented method of claim 1, wherein:
   the user identification is selected in a selectable object by the user in the virtual environment in order to delete the cryptographic keys appended with the user identification having been selected; and
   a second user identification is selectable in the selectable object in order to delete the cryptographic keys appended with the second user identification.

5. The computer-implemented method of claim 1, wherein:
   the virtual environment comprises virtual rooms;
   messages in the virtual rooms are found by searching for the user identification appended to the cryptographic keys; and
   the messages in the virtual rooms are deleted by deleting the cryptographic keys appended with the user identification.

6. The computer-implemented method of claim 1, further comprising:
   providing a new user identification for upcoming messages; and
   embedding the new user identification with other cryptographic keys that are utilized to sign the upcoming messages.

7. A system comprising:
   a memory having computer readable instructions; and
   one or more processors for executing the computer readable instructions, the computer readable instructions controlling the one or more processors to perform operations comprising:
   in response to receiving a request to remove interactions from a virtual environment, searching the virtual environment for cryptographic keys embedded with a user identification corresponding to the request, wherein the user identification is appended to the cryptographic keys of a user to uniquely correspond to the user;
   displaying a username of the user in the virtual environment, the username being different from the user identification, wherein the user identification fails to be displayed in the virtual environment, wherein the searching the virtual environment comprises searching for the user identification in the virtual environment;

in response to finding the user identification in the virtual environment, deleting the cryptographic keys embedded with the user identification in the virtual environment, wherein the interactions have been signed with the cryptographic keys embedded with the user identification in the virtual environment; and in response to deleting the cryptographic keys embedded with the user identification in the virtual environment, causing a modification to a presentation of the interactions in the virtual environment, wherein causing the modification to the presentation of the interactions in the virtual environment comprises obfuscating and deleting messages sent with the cryptographic keys appended with the user identification from the virtual environment.

8. The system of claim 7, wherein the one or more processors perform operations further comprising causing the cryptographic keys embedded with the user identification to be deleted from user terminals coupled to the virtual environment based on the user identification being found during the searching.

9. The system of claim 7, wherein:
the user identification anonymously corresponds to the user in the virtual environment for one or more first dates;
a second user identification anonymously corresponds to the user in the virtual environment for one or more second dates different from the one or more first dates; and
the user identification or the second user identification is selected to be appended to the cryptographic keys.

10. The system of claim 7, wherein:
the user identification is selected in a selectable object by the user in the virtual environment in order to delete the cryptographic keys appended with the user identification having been selected; and
a second user identification is selectable in the selectable object in order to delete the cryptographic keys appended with the second user identification.

11. The system of claim 7, wherein:
the virtual environment comprises virtual rooms;
messages in the virtual rooms are found by searching for the user identification appended to the cryptographic keys; and
the messages in the virtual rooms are deleted by deleting the cryptographic keys appended with the user identification.

12. The system of claim 7, wherein the one or more processors perform operations further comprising:
providing a new user identification for upcoming messages; and
embedding the new user identification with other cryptographic keys that are utilized to sign the upcoming messages.

13. A computer program product comprising a non-transitory computer readable storage medium having program instructions embodied therewith, the program instructions executable by one or more processors to cause the one or more processors to perform operations comprising:
in response to receiving a request to remove interactions from a virtual environment, searching the virtual environment for cryptographic keys embedded with a user identification corresponding to the request, wherein the user identification is appended to the cryptographic keys of a user to uniquely correspond to the user;

displaying a username of the user in the virtual environment, the username being different from the user identification, wherein the user identification fails to be displayed in the virtual environment, wherein the searching the virtual environment comprises searching for the user identification in the virtual environment;

in response to finding the user identification in the virtual environment, deleting the cryptographic keys embedded with the user identification in the virtual environment, wherein the interactions have been signed with the cryptographic keys embedded with the user identification in the virtual environment; and in response to deleting the cryptographic keys embedded with the user identification in the virtual environment, causing a modification to a presentation of the interactions in the virtual environment, wherein causing the modification to the presentation of the interactions in the virtual environment comprises obfuscating and deleting messages sent with the cryptographic keys appended with the user identification from the virtual environment.

14. The computer program product of claim 13, wherein the one or more processors to perform operations further comprising causing the cryptographic keys embedded with the user identification to be deleted from user terminals coupled to the virtual environment based on the user identification being found during the searching.

15. The computer program product of claim 13, wherein:
the user identification anonymously corresponds to the user in the virtual environment for one or more first dates;
a second user identification anonymously corresponds to the user in the virtual environment for one or more second dates different from the one or more first dates; and
the user identification or the second user identification is selected to be appended to the cryptographic keys.

16. The computer program product of claim 13, wherein:
the user identification is selected in a selectable object by the user in the virtual environment in order to delete the cryptographic keys appended with the user identification having been selected; and
a second user identification is selectable in the selectable object in order to delete the cryptographic keys appended with the second user identification.

17. The computer program product of claim 13, wherein:
in the virtual environment comprises virtual rooms;
messages in the virtual rooms are found by searching for the user identification appended to the cryptographic keys; and
the messages in the virtual rooms are deleted by deleting the cryptographic keys appended with the user identification.

18. A computer-implemented method comprising:
receiving a user identification for a virtual environment, the user identification not being displayed in the virtual environment;
in response to receiving the user identification, searching the virtual environment for cryptographic keys having the user identification, wherein the user identification is appended to the cryptographic keys of a user to uniquely correspond to the user;
displaying a username of the user in the virtual environment, the username being different from the user identification, wherein the user identification fails to be displayed in the virtual environment, wherein the searching the virtual environment comprises searching for the user identification in the virtual environment;

in response to finding the user identification in the virtual environment, deleting the cryptographic keys having the user identification in the virtual environment, wherein messages are signed with the cryptographic keys; and in response to deleting the cryptographic keys having the user identification in the virtual environment, obfuscating and deleting the messages signed with the cryptographic keys having the user identification in the virtual environment.

19. A system comprising:

a memory having computer readable instructions; and one or more processors for executing the computer readable instructions, the computer readable instructions controlling the one or more processors to perform operations comprising:

receiving a user identification for a virtual environment, the user identification not being displayed in the virtual environment;

in response to receiving the user identification, searching the virtual environment for cryptographic keys having the user identification, wherein the user identification is appended to the cryptographic keys of a user to uniquely correspond to the user;

displaying a username of the user in the virtual environment, the username being different from the user identification, wherein the user identification fails to be displayed in the virtual environment, wherein the searching the virtual environment comprises searching for the user identification in the virtual environment;

in response to finding the user identification in the virtual environment, deleting the cryptographic keys having the user identification in the virtual environment, wherein messages are signed with the cryptographic keys; and in response to deleting the cryptographic keys having the user identification in the virtual environment, obfuscating and deleting the messages signed with the cryptographic keys having the user identification in the virtual environment.

* * * * *